United States Patent [19]
Ootaka et al.

[11] Patent Number: 5,532,837
[45] Date of Patent: Jul. 2, 1996

[54] DIGITAL VIDEO SIGNAL PROCESSING APPARATUS

[75] Inventors: Hideki Ootaka, Neyagawa; Tatsuro Juri, Osaka, both of Japan

[73] Assignee: Matsushita Electric Industrial Co., Ltd., Osaka, Japan

[21] Appl. No.: 154,468

[22] Filed: Nov. 18, 1993

[30] Foreign Application Priority Data

Dec. 18, 1992 [JP] Japan ................................. 4-338419

[51] Int. Cl.⁶ .......................... H04N 5/94; H04N 5/91; H04N 5/21
[52] U.S. Cl. ........................ 358/336; 358/340; 348/608
[58] Field of Search .................... 358/336, 335, 358/340; 348/398, 400, 616, 607, 608, 466; 360/33.1

[56] References Cited

U.S. PATENT DOCUMENTS

| | | | |
|---|---|---|---|
| 4,799,113 | 1/1989 | Murakami | 360/32 |
| 5,193,010 | 3/1993 | Juri et al. | 358/336 |
| 5,267,094 | 11/1993 | Aoki | 360/32 |
| 5,313,471 | 5/1994 | Otaka et al. | 371/31 |
| 5,355,379 | 10/1994 | Hossin et al. | 371/54 |

FOREIGN PATENT DOCUMENTS

| | | |
|---|---|---|
| 0353757 | 2/1990 | European Pat. Off. . |
| 0514188 | 11/1992 | European Pat. Off. . |
| 3-242877 | 10/1991 | Japan . |

OTHER PUBLICATIONS

"An Experimental Study for a Home–Use Digital VTR", Yamamitsu et al., IEEE Transactions on Consumer Electronics, vol. 35, No. 3, Aug. 1989, pp. 450–457.

*Primary Examiner*—Tommy P. Chin
*Assistant Examiner*—Robert Chevalier
*Attorney, Agent, or Firm*—Wenderoth, Lind & Ponack

[57] ABSTRACT

In a digital video signal recording and reproducing apparatus using bit rate reduction coding, information multiplexed to each record block is selected depending on the reproducing process applied to reproduce record blocks. When error correction is carried out and then, error concealment is applied to any record block having an error uncorrectable by the error correction, error concealment information indicating that the error concealment was carried out is multiplexed to the record block to be outputted. Also, since the continuity of bit rate reduction encoded data may be broken by concealing a part of record blocks, decoding information for controlling the decoding of bit rate reduction encoded data is multiplexed to the record block to be outputted. When an error concealment is not carried out in the bit rate reduction encoded state, an error flag indicating that an error exists is multiplexed to the record block to be outputted.

5 Claims, 9 Drawing Sheets

| UNIT n   | Q. NUMBER | 1 0 1 0 | ENCODED DATA |
|----------|-----------|---------|--------------|
| UNIT n+1 | Q. NUMBER | 0 0 0 0 | ENCODED DATA |
| UNIT n+2 | Q. NUMBER | 0 0 0 0 | ENCODED DATA |
| UNIT n+3 | Q. NUMBER | 0 0 0 0 | ENCODED DATA |
| UNIT n+4 | Q. NUMBER | 0 0 0 0 | ENCODED DATA |

STATUS

FIG. 12(b)

| UNIT n   | Q. NUMBER | 0 0 1 0 | ENCODED DATA |
|----------|-----------|---------|--------------|
| UNIT n+1 | Q. NUMBER | 0 0 1 0 | ENCODED DATA |
| UNIT n+2 | Q. NUMBER | 0 0 1 0 | ENCODED DATA |
| UNIT n+3 | Q. NUMBER | 0 0 1 0 | ENCODED DATA |
| UNIT n+4 | Q. NUMBER | 0 0 1 0 | ENCODED DATA |

STATUS

DIGITAL VIDEO SIGNAL PROCESSING APPARATUS

BACKGROUND OF THE INVENTION

1. Field of the Invention

This invention relates to a digital video signal recording/reproducing apparatus using bit rate reduction coding and having a function of outputting reproduced data in a form of a bit rate reduction coded state.

2. Description of the Prior Art

Under a progressive recent trend toward making high quality, digital home-use video equipment, video signal recording and reproducing equipment using digital recording technology have been developed. However, if an input video signal is a 4:2:2 component signal, for example, the transmission rate becomes as high as 216 Mbps, and if it is directly recorded, a large recording capacity for allowing a long-time recording cannot be realized. As a result, in order to obtain an adequately-long recording time for home-use, it is required to efficiently reduce the quantity of image data to a degree capable of obtaining allowable picture quality by bit rate reduction coding technology. The structure and operation of a conventional digital video signal recording and reproducing apparatus using bit rate reduction coding technology is described below.

First, when recording, an input video signal is converted into a digital signal by an A/D converter and compressed into a predetermined quantity of data by a bit rate reduction encoder. As a method of bit rate reduction encoding the video signal, a method of using an orthogonal transformation is generally employed from the viewpoint of compression efficiency. The orthogonal transformation divides plural pixels into blocks and converts the pixels into frequency regions on a block by block basis. By encoding the transformed coefficients by variable length encoding, the data can be efficiently compressed. In this case, if the unit for the variable length encoding is increased, the efficiency of encoding can be improved. On the other hand, if an error is generated, the range of error propagation becomes large. As a result, in the digital video signal recording and reproducing apparatus having a higher probability of error generation than other transmission lines, an encoding method in which the bit rate reduction encoding is performed in a unit of plural blocks (hereinafter called a compression block) has been introduced.

Next, in an error correction encoder, an error correction parity coded is added, and then a sync signal and identification data (ID) are added to form a recording block (hereinafter called a sync block). Then, the sync block is modulated for recording and is recorded on a recording tape. The sync block is essentially composed of a sync signal for detecting the sync block from the reproduced signal, identification data (ID) containing a track number for correctly writing the reproduced sync block into a memory and a sync block number, bit rate reduction encoded data of the video signal, and the error correction parity code. The sync blocks thus composed are recorded on a track on the tape.

Next, when reproducing, a reproduced signal from a reproducing head is subjected to detection and demodulation of the sync block, and subjected to error correction in an error correction decoder according to the error correction parity code added during recording. Error correction is effected up to a certain number of errors by this process. However, if a dropout occurred, for example, due to tape damage such dropout error that cannot be corrected by the error correction decoder. If an uncorrectable error occurred as such, error concealment is performed so that the influence of the error can be as inconspicuous as possible visually. The influence of the error propagates to the range within which a variable length encoding is completed. As a result, in an error concealment circuit, error concealment is carried out by substituting an entire sync block forming a compression block containing erroneous data with a previous corresponding sync block. The concealed data is decoded into the original data in a bit rate reduction decoder and converted through a D/A converter into the analog signal. A digital recording VTR using the bit rate reduction coding technology as shown above is disclosed, for example, in "An Experimental Study on a Home-Use Digital VTR" by C. Yamamitsu et al., IEEE Transaction on Consumer Electronics, Vol. 35, No. 3, August 1989, pp. 450–457.

In the digital recording, a data sequence of 0 and 1 is recorded. If 0 and 1 are detected erroneously due to the distortion of the reproduced waveform, it becomes an error of the data. In this case, if the error rate is a predetermined value or less, the error can be corrected by error correction techniques. Therefore, by setting the correctability adequately with respect to the error rate of the reproduced data, perfectly correct data can be reproduced. As a result, contrary to the analog recording in which repetition of dubbing results in an increase and accumulation of distortion, the digital recording is largely advantageous in that deterioration due to dubbing can be largely reduced. Here, "dubbing" means that a signal reproduced from one reproducing apparatus is sent to and recorded by another recording apparatus. Particularly, in digital dubbing using no analog processing, deterioration of the signal can be further largely reduced.

Here, when the orthogonal transform encoding is used as a method of bit rate reduction encoding of a video signal, the orthogonal transformation and inverse orthogonal transformation are actually processed in a finite word length, so that the repetition of the orthogonal and inverse orthogonal transformations results in an accumulation of operational errors, leading to an increase in distortion. Besides, when that filtering processes such as decimation, interpolation and the like are additionally carried out, the repetition of such filtering processes results in an increase in distortion as well. As a result, though the digital recording is advantageous in that deterioration due to dubbing is small compared with the analog recording, the distortion will be increased whenever the digital dubbing is carried out, so that picture quality after the dubbing has been carried out several times may be deteriorated to such a degree that it can be visually sensedw compared with the original picture quality. Accordingly, in order to prevent deterioration due to dubbing from being accumulated, a method of dubbing signals in the bit rate reduction encoded state is disclosed, for example, in U.S. Pat. No. 5,193,010.

However, the method disclosed therein is such that concealed data are outputted for dubbing in any case. As a result, it cannot respond to any case where error concealment is not carried out in the bit rate reduction encoded state. Also, even when the concealment is to be carried out, it must be done in the form that the decoding is correctly carried out in the bit rate reduction decoder.

SUMMARY OF THE INVENTION

An object of this invention is to provide an apparatus for processing digital video signals subjected to bit rate reduction coding, which is capable of restraining deterioration of data due to digital dubbing and correctly decoding the data after dubbing so as to thereby reproduce a high quality picture.

To achieve the above object, the present invention provides a digital video signal processing apparatus for reproducing a digital video signal from bit rate reduction coded data recorded on a recording medium in the form of record blocks which have been produced by dividing a digital video signal into small blocks, forming macro blocks each being composed of a specified number of small blocks, bit rate reduction encoding each of the macro blocks, forming record blocks from the encoded macro blocks, respectively, and recording the record blocks on the recording medium, wherein each reproduced record block of bit rate reduction encoded data is multiplexed with a concealment information data concerning an error concealment of the record block. The reproduced record block may further be multiplexed with a decoding information data concerning a decoding of the record block or an error flag indicating an existence or absence of an error in the record block. The concealment information data, decoding information data and error flag may be included in a single status information.

More specifically, in one aspect of the invention, a digital video signal processing apparatus comprises: reproducing means for reproducing the record blocks from the recording medium; error correction means coupled to the reproducing means for correcting errors contained in the reproduced record blocks; error concealment means coupled to the error correction means for performing error concealment of each record block having an error which cannot be corrected by the error correction means; multiplexing means coupled to the error concealment means for multiplexing each record block with a concealment information data concerning the error concealment; first output means coupled to the multiplexing means for outputting the record blocks each being multiplexed with the concealment information data; decoding means coupled to the multiplexing means for decoding bit rate reduction encoded data in each of the record blocks to obtain a decoded digital video signal; and second output means coupled to the decoding means for outputting the decoded digital video signal. Preferably, the multiplexing means may further multiplexes each record block which has been concealed by the error concealment means with a decoding information data concerning decoding of the record block, and each record block which has not been concealed by the error concealment means with an error flag indicating whether or not an error exists in the record block. In this case, the decoding means decodes the bit rate reduction encoded data of each record block according to the decoding information data multiplexed to the record block, and the first output means outputs the record blocks each being multiplexed with not only the concealment information data but also either the decoding information data or the error flag. In another modification, the multiplexing means may express the concealment information data, the decoding information data and the error flag by a single coded data and multiplexes the single coded data as a status information data.

In another aspect of the invention, a digital video signal processing apparatus comprises: reproducing means for reproducing the record blocks from the recording medium; error correction means coupled to the reproducing means for correcting errors contained in the reproduced record blocks; multiplexing means coupled to the error correction means for multiplexing each record block with a concealment information data concerning an error concealment and a first error flag indicating whether or not an error exists in the record block; first output means coupled to the multiplexing means for outputting the record blocks each being multiplexed with the concealment information data and the first error flag; decoding means coupled to the multiplexing means for decoding bit rate reduction encoded data in each of the record blocks according to the first error flag multiplexed to each record block to obtain a decoded digital video signal and for outputting a second error flag for each small block or each macro block of the decoded digital video signal; error concealment means for performing an error concealment of each small block or macro block having an error and contained in the decoded digital video signal according to the second error flag; and second output means coupled to the error concealing means for outputting the decoded digital video signal having been subjected to the error concealment.

With the structures as described above, the digital video signal processing apparatus using bit rate reduction coding of this invention selects the information to be multiplexed to each reproduced record block depending on the reproducing process. First, when the error correction is carried out and then the error concealment is applied to any record block having an error uncorrectable by the error correction means, a concealment information data indicating that an error concealment has been carried out is multiplexed to the record block. Also, since continuity of the bit rate reduction encoded data may be broken by concealing a part of the record blocks, information concerning decoding becomes necessary. So, a decoding information data indicating a decoding method of bit rate reduction encoded data is also multiplexed. When the error concealment is not carried out in the bit rate reduction encoded state, an error flag is multiplexed to the corresponding record block to be outputted.

Consequently, the apparatus of this invention is capable of reducing deterioration of data due to digital dubbing and correctly processing the data after dubbing so as to thereby reproduce a high quality picture.

BRIEF DESCRIPTION OF THE DRAWINGS

FIG. 12 (a) is a diagram for explaining STATUS information data to be set when the STATUS information data is defined as shown in Table 2 and one UNIT of one compression block is erroneous.

FIG. 12 (b) is a diagram for explaining STATUS information data to be set when the STATUS information data is defined as shown in Table 2 and all UNITs of one compression blocks are erroneous.

DESCRIPTION OF THE PREFERRED EMBODIMENTS

Figure 7:
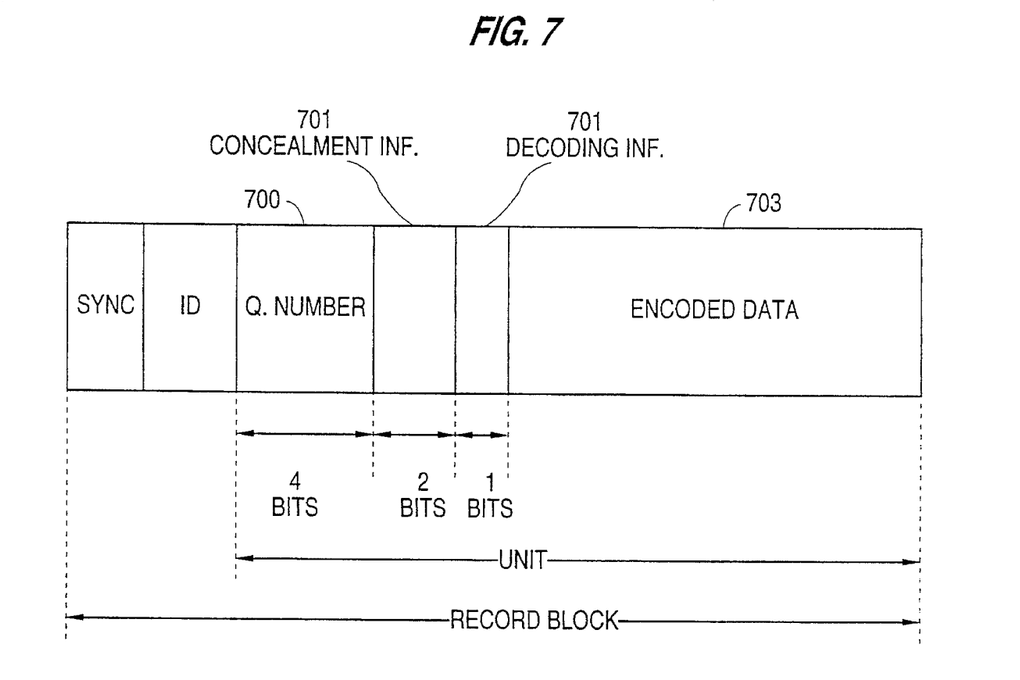
FIG. 7 is a diagram for explaining a UNIT structure multiplexed with concealment information data and an additional information data.
Figure 11:
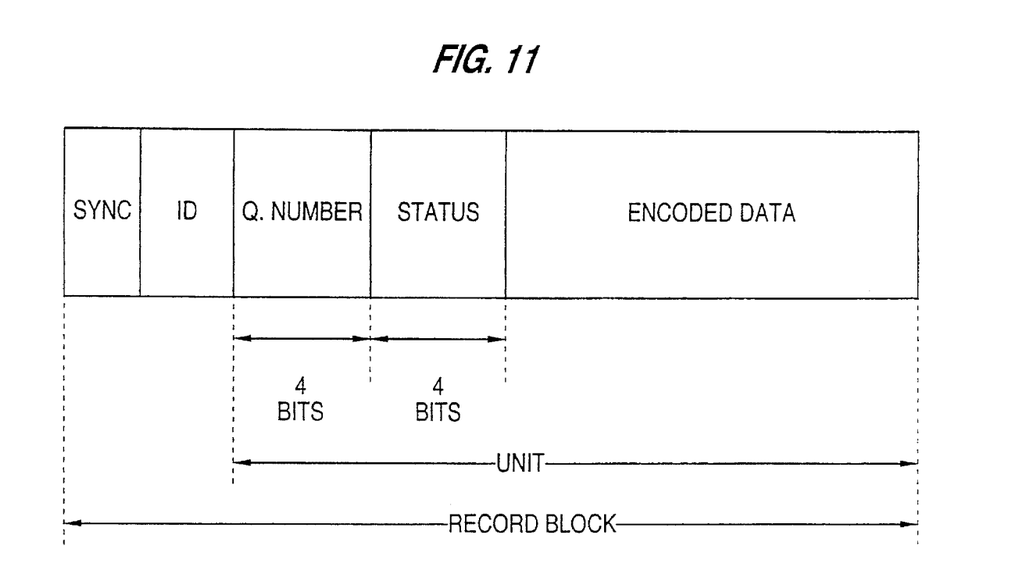
FIG. 11 is a diagram for explaining a UNIT structure multiplexed with a STATUS information data when the STATUS information data is defined as shown in Table 2.

Preferred embodiments of this invention will be described below while referring to the drawings, in which a processing unit corresponding to a sync block, or a record block, is called "UNIT". More specifically, bit rate reduction encoded data is recorded on a recording medium (a magnetic tape in the embodiments) in the form of record blocks each composed of a sync signal, dentification data (ID) and a UNIT which is composed of a head area and encoded data as shown in FIGS. 7 and 11.

Figure 1:
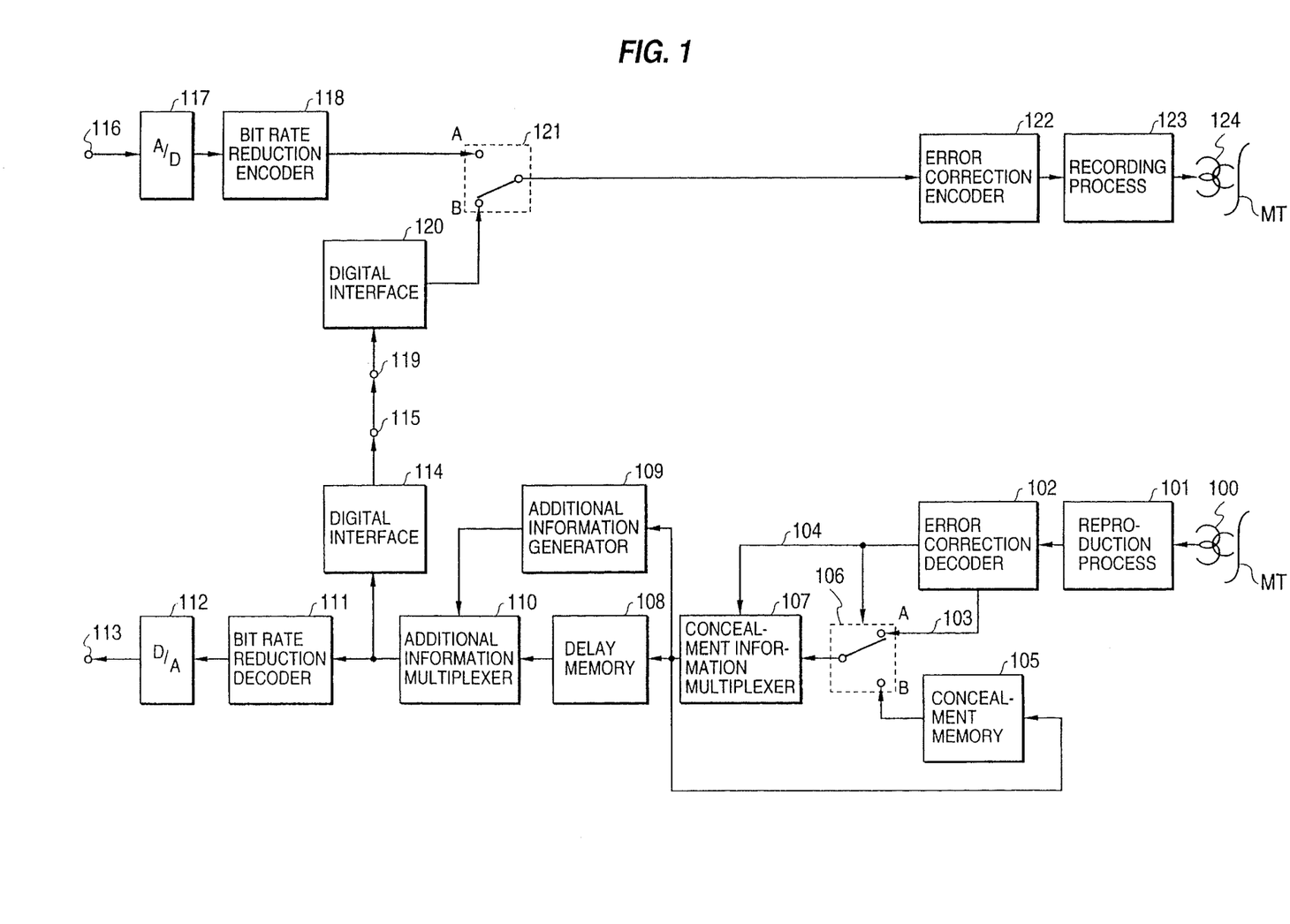
FIG. 1 is a block diagram of a digital video signal processing apparatus according to a first embodiment of this invention.

FIG. 1 is a block diagram of a digital video signal processing apparatus according to a first embodiment of this invention. This apparatus comprises, on the reproduction side thereof, a reproducing head 100, a reproduction processing circuit 101 which amplifies, detects and demodulates data reproduced through the reproducing head 100 from a magnetic tape MT, an error correction decoder 102 which produces error correction decoded data 103 and a flag 104 showing the existence of an error on a UNIT by UNIT basis, a concealment memory 105, a switch 106 for selecting the output data 103 of the error correction decoder 102 and output data of the concealment memory 105 on a UNIT by UNIT basis, a concealment information multiplexer 107 for multiplexing data showing that an error concealment has been carried out (hereinafter called concealment information data) with respect to the concealed UNIT, a delay memory 108 for delaying data for five UNITs, an additional information generator 109 which detects the concealment information data multiplexed to each UNIT to generate additional information data according to the detected result, an additional information multiplexer 110 for multiplexing the additional information data to each UNIT, a bit rate reduction decoder 111, a D/A converter 112 for converting bit rate reduction decoded data into an analog signal, an output terminal 113 for outputting of a reproduced video signal, a digital interface circuit 114 for converting bit rate reduction encoded digital data into a transmission format suited to transmission, and an output terminal 115 for outputting of the digital data in the transmission format. Furthermore, the apparatus comprises, on the recording side thereof, an input terminal 116 of an analog video signal, an A/D converter 117 for converting the analog video signal into a digital signal, a bit rate reduction encoder 118, an input terminal 19 for receiving the digital data outputted from the output terminal 115, a digital interface circuit 120 for converting the digital data in the transmission format sent from the terminal 119 into the original bit rate reduction encoded digital data, a switch 121 for selecting output data of the bit rate reduction encoder 119 and output data of the digital interface circuit 120, an error correction encoder 122, a recording processing circuit 123 for effecting modulation for recording, and a recording head 124 for recording the modulated data on a magnetic tape MT. The operation of the apparatus constituted as above will be explained below.

Figure 2:
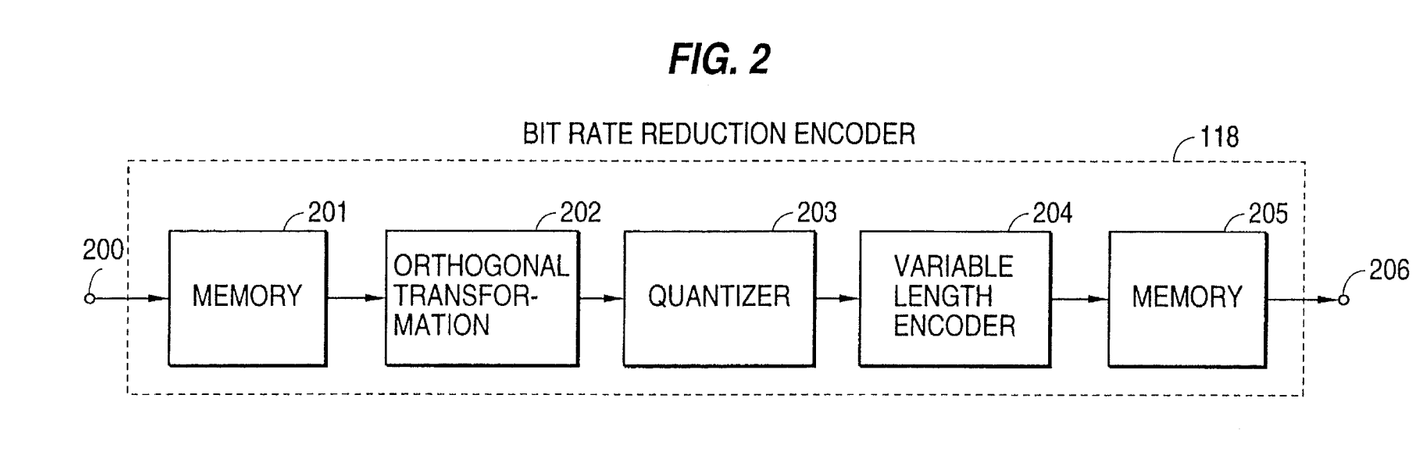
FIG. 2 is a block diagram showing a detailed structure of the bit rate reduction encoder 118 shown in FIG. 1.

First, a description follows on the bit rate reduction encoding and decoding processes. FIG. 2 is a block diagram of the bit rate reduction encoder 118 shown in FIG. 1. The encoder 118 comprises an input terminal 200 for receiving a video digital signal from the A/D converter 117, a memory 201 for dividing the digital video signal into small blocks each composed of 8 horizontal pixels×8 vertical pixels, an orthogonal transformation circuit 202 for performing two dimensional orthogonal transformation of data in each small blocks of 8×8 pixels, a quantizer 203, a variable length encoder 204, a memory 205 for inserting variable length encoded data into UNITs, and an output terminal 206 for outputting the data disposed into UNITs.

Figure 3:
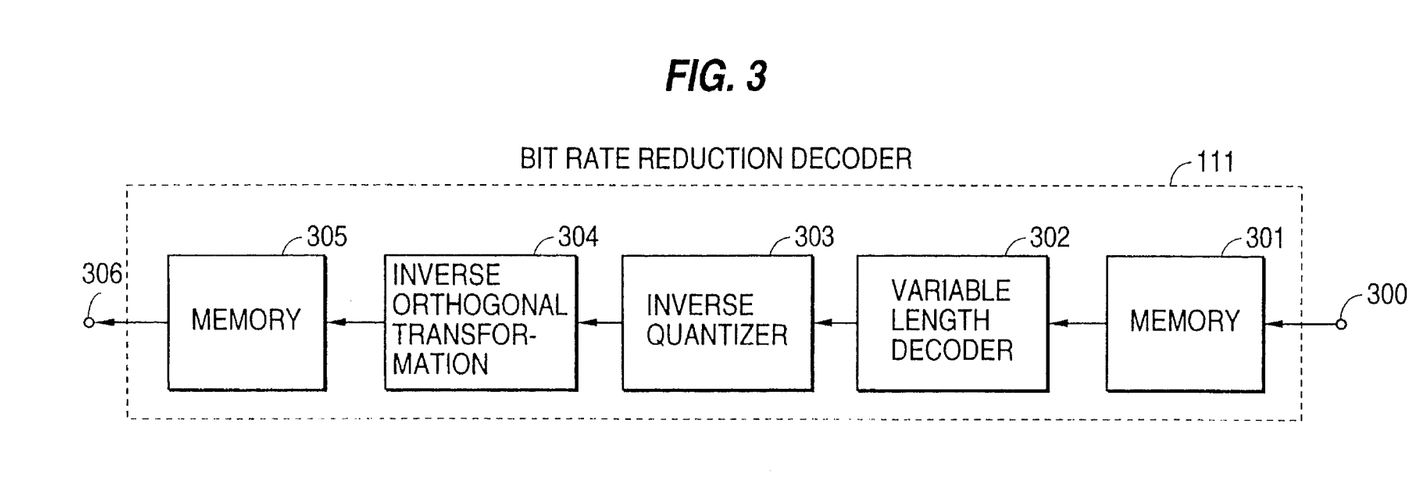
FIG. 3 is a block diagram showing a detailed structure of the bit rate reduction decoder 111 shown in FIG. 1.

FIG. 3 is a block diagram of the bit rate reduction decoder 111 shown in FIG. 1. The decoder 111 comprises an input terminal 300 for receiving the data disposed into UNITs, a memory 301 for re-arranging the variable length encoded data disposed into UNITs in the order to be decoded, a variable length decoder 302, an inverse quantizer 303, an inverse orthogonal transformation circuit 304, a memory 305 for rearranging data on a block by block basis in the original order, and an output terminal 306 for outputting the decoded data thus re-arranged in the original order.

Figure 4:
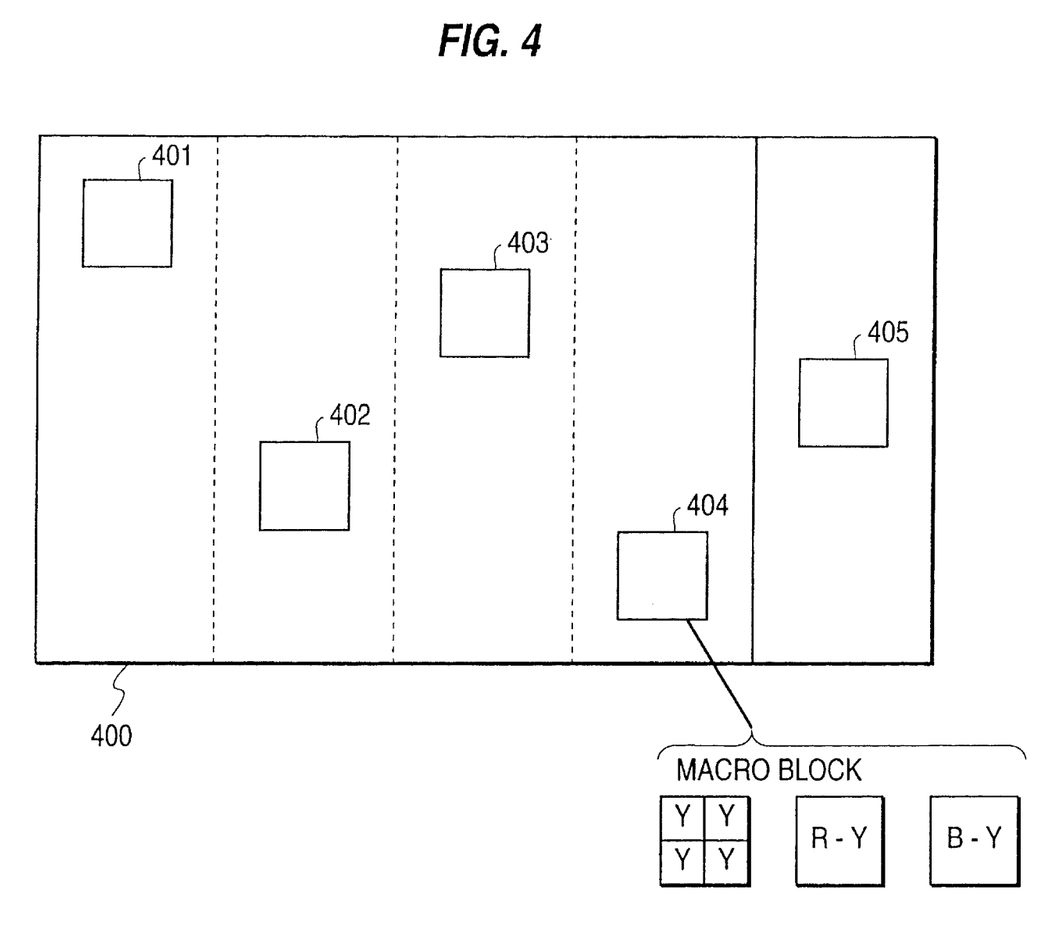
FIG. 4 is an explanatory diagram of a method of reading out a compression block.

Referring to FIG. 2, digital video signals received through the terminal 200 are written successively into the memory 201. In the memory 201, one frame is formed of two fields and the data is read out in the form of small blocks each composed of 8×8 pixels. In this embodiment, the bit rate reduction encoding is carried out so that the quantity of data after variable length encoding is always kept constant in units of 30 small blocks. Therefore, the data is read out from the memory 201 in a unit of a compression block consisting of 30 small blocks. FIG. 4 is a diagram showing a method of reading out the compression block from the memory 201, in which one frame 400 forming one picture is divided into five regions. From each region, four luminance signal blocks and two chrominance signal blocks (one R-Y block and one B-Y block) are read out. Here, the input video signal is a 4:2:2 component signal, in which the chrominance signal has been decimated by one for every two lines. Accordingly, four luminance signal blocks and each of two chrominance signal blocks have the same position and area on a picture. A set of the four luminance signal blocks and two chrominance signal blocks is called a macro block. One compression block is composed of five macro blocks 401, 402, 403, 404 and 405.

Figure 5:
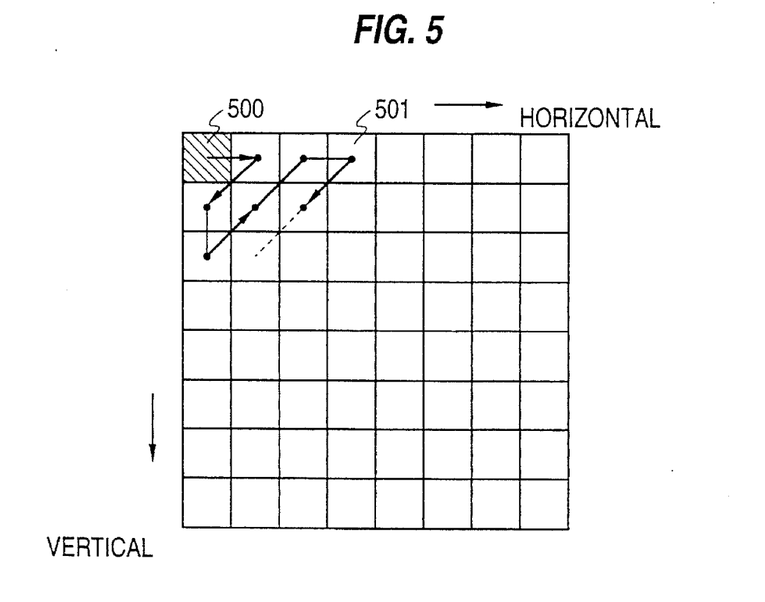
FIG. 5 is a diagram for explaining the order of variable length encoding coefficients obtained by orthogonal transformation.

Next, the data thus read out from the memory 201 is subjected to two-dimensional orthogonal transformation in the orthogonal transformation circuit 202 for each small block, quantized in the quantizer 203, and variable length encoded in the variable length encoder 204 FIG. 5 is a diagram showing the order of variable-length encoding the coefficients obtained by the orthogonal transformation in the orthogonal transformation circuit 202 in the unit of the block of 8 x 8 pixels, in which a shaded area 500 shows the DC component and an area 501 shows the AC components. As shown in FIG. 5, the coefficients are encoded by zigzag scan successively from the DC component, lower frequency AC components to higher frequency AC components. The quantizer 203 quantizes the data so that the quantity of data after variable length encoding is always kept constant in the compression block unit. The variable length encoded data in each compression block are written successively from the lower to higher frequency components into the memory 205. In the memory 205, the variable length encoded data of the five macro blocks forming one compression block is divided and inserted into five UNITs.

Figure 6:
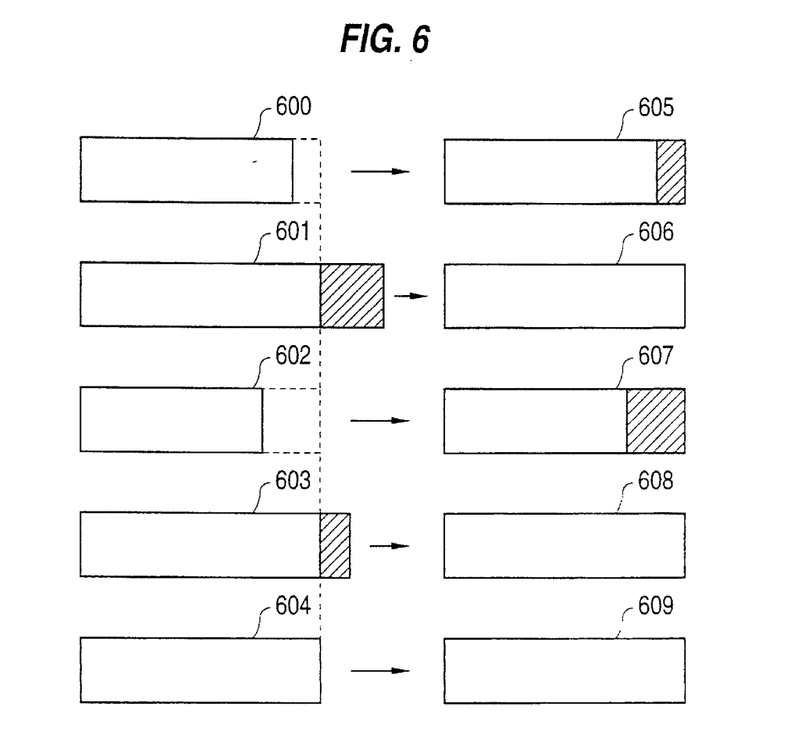
FIG. 6 is an explanatory diagram of a method of inserting variable length encoded data into five UNITs.

FIG. 6 is a diagram showing a method of inserting the variable length encoded data of five macro blocks by the memory 205 into five UNITs. The data 600, 601, 602, 603 and 604 are respectively obtained by encoding the five micro blocks. The data of each macro block are inserted into a corresponding one of UNITs 605, 606, 607, 608 and 609 successively from the first data. Here, since the quantity of data of each of the five macro blocks is not constant, there may occur such a case that the quantity of encoded data of one macro block becomes larger or smaller than the quantity of data insertable into the corresponding UNIT. In the case that a macro block has a larger quantity of data than the capacity of the corresponding UNIT, the excess data shown by a shaded area in FIG. 6 is inserted into a vacant area of the other UNITs. With the unit structure as described above, one macro block corresponds to one UNIT, so that if one UNIT can be reproduced, the corresponding macro block can be reproduced on a picture. In addition, the data inserted into any other UNIT because of an excess of the data quantity corresponds to the high frequency components of a macro block, so that even if such data is lost, a large deterioration in picture quality does not occur.

On the other hand, in the bit rate reduction decoder shown in FIG. 3, the data in the compression block inserted into UNITs are re-arranged in the memory 301 in the order to be variable length decoded, and applied with the inverse processes to the encoding processes through the variable length decoder 302, the inverse quantizer 303, inverse orthogonal transformation circuit 304 and memory 305.

With the digital video signal recording and reproducing apparatus using the bit rate reduction encoding and decoding processes as described above, the reproduction process of data inserted into UNITs and recorded will be described below by referring to FIG. 1.

The data reproduced from the reproducing head 100 is detected and decoded in the reproduction processing circuit 101, and sent to the error correction decoder 102. In the error correction decoder 102, the error correction is carried out in accordance with the error correction parity added in the recording processing. The error correction decoded data 103 is sent out from the error correction decoder 102 together with the flag 104. The flag 104 is sent to each UNIT, and set to a "0" if the UNIT has no error and set to a "1" if the UNIT has an error.

Next, the error concealment in response to the flag 104 is described below. The error concealment uses the concealment memory 105 and the switch 106. The switch 106 is switched on a UNIT by UNIT basis in response to the flag 104. First, in the case of any UNIT having the flag 104 set to a "0" that is, any UNIT that has no error, the switch 106 is set to the A-side thereof. Then, the data 103 read out from the error correction decoder 102 is selected and sent to the concealment information multiplexer 107 to be multiplexed with the concealment information data, and written into the delay memory 108 and the concealment memory 105. Next, in the case of any UNIT having the flag 104 set to a "1" that is, in the case of any UNIT that has an error, the switch 106 is set to the B-side thereof. Then, the data of a corresponding UNIT of one frame before is read out from the concealment memory 105 and sent to the concealment information multiplexer 107 to be multiplexed with the concealment information data, and written into the delay memory 108 and the concealment memory 105. Namely, the data of any correct UNIT is directly sent out and simultaneously written into the concealment memory 105. On the other hand, the data of the corresponding UNIT of one frame before is read out from the concealment memory 105 instead of the data of any UNIT that has an error, and written again into the concealment memory 105. As a result, the concealment memory 105 always has stored therein only the data of correct UNITs for error concealment of data of the next and following frames.

Here, in the concealment information multiplexer 107, the concealment information data is multiplexed to two first existing bits of each UNIT in response to the flag 104. The concealment information shows whether an error concealment was performed for each UNIT. The concealment information data is, as shown in Table 1, set to "00" when the error concealment was not performed, and to codes than other "00" depending on the concealment method when the concealment was performed. In this embodiment, the substitution is made with the data of the corresponding UNIT of at least one frame before, so that in the case that the flag 104 is set to a "0" the concealment information data is set to in the case that the flag 104 is set to a "1" the concealment information data is set to "01" or "11". At the time of first recording, the concealment information data is always set to "00" and multiplexed.

The data subjected to the error concealment as described above is written into the delay memory 1 08 The delay memory 108 is a memory for delaying data inputted thereto by a time period corresponding to five UNITs which is a processing time of the input data by the additional information generator 109. The additional information generator 109 detects the concealment information data of the five UNITs constituting the compression block and outputs an error flag or a decoding information data as additional information in accordance with the concealment information data as shown-in Table 1. First, in the case that the concealment information data is "00" showing that no error concealment was carried out, the additional information is used as the error flag. Here, the condition of a UNIT may be classified into such two cases that the UNIT has no error and that the UNIT has an error but was not subjected to error concealment. As a result, for these two cases, the error flag is defined as shown in Table 1.

Next, in the case that the concealment information data is not "00" the additional information is used as the decoding information. The concealment information data is set to a code other than "00" in the case that the error concealment was carried out for the record block, so that it is meaningless to define the error flag because an error does not exist after the error concealment. On the other hand, such a case may occur that the data which has overflowed from any other UNIT cannot be ensured to be decoded by concealing a part of the five UNITs constituting the compression block. Accordingly, the decoding information data is defined as shown in Table 1 instead of the error flag.

TABLE I

| Concealment information | 00 UNIT is not concealed. |
|---|---|
| | 01 UNIT is concealed from one frame before. |
| | 10 UNIT is concealed from one frame after. |
| | 11 UNIT is concealed by other method. |
| If concealment information is "00": | |
| Error flag | 0 UNIT has no error. |
| | 1 UNIT has an error. |
| If concealment information is not "00": | |

TABLE I-continued

| | |
|---|---|
| Decoding information | 0 Data from other UNITs are usable.<br>1 Data from other UNITs are not usable. |

FIG. 7 is a diagram showing a data arrangement of a UNIT having the additional information data multiplexed, in which 700 is a four-bit piece of quantization information data, 701 is a two-bit piece of concealment information data, 702 is a one-bit piece of additional information data and 703 is bit rate reduction encoded data. Hereinafter, the concealment information data and the additional information data to be multiplexed to the UNITs are collectively called STATUS information data.

The STATUS information is defined as shown below depending on the concealed pattern of the UNITs constituting one compression block.

(1) In case that a part of the UNITs is concealed:

For example, in the case that one UNIT of one compression block is erroneous, the UNIT is, replaced by a corresponding UNIT of one frame before and the concealment information data is set to "01". In this case, encoded data of other macro-blocks overflowed from another UNIT may possibly exist in the erroneous UNIT. Such overflow data may possibly be lost and not used in decoding, so that the decoding information data is set to a "1".

(2) In case that all of the five UNITs are concealed:

In case that all five UNITs constituting one compression block are erroneous due to burst error or the like, each of the five UNITs is replaced by corresponding one of the UNITs of one frame before and the concealment information data is set to "01". In this case, the encoded data which has overflowed from the corresponding macro block can be decoded, so that the decoding information data is set to a "0" for each of the five UNITs.

Figure 8A:
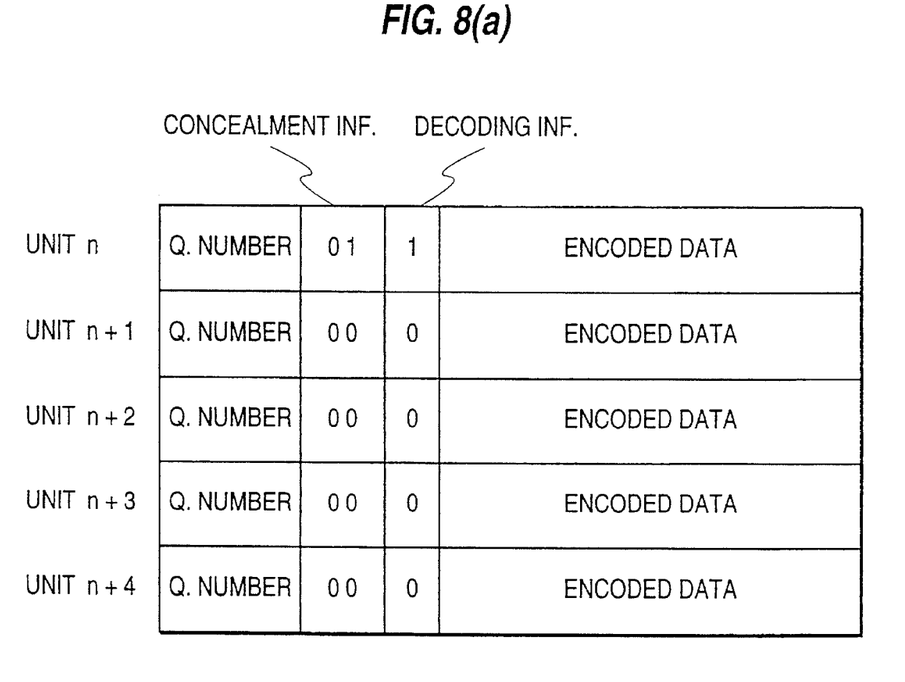
FIG. 8(a) is a diagram for explaining a concealment information data and additional information data to be set when one UNIT of one compression block is erroneous.
Figure 8B:
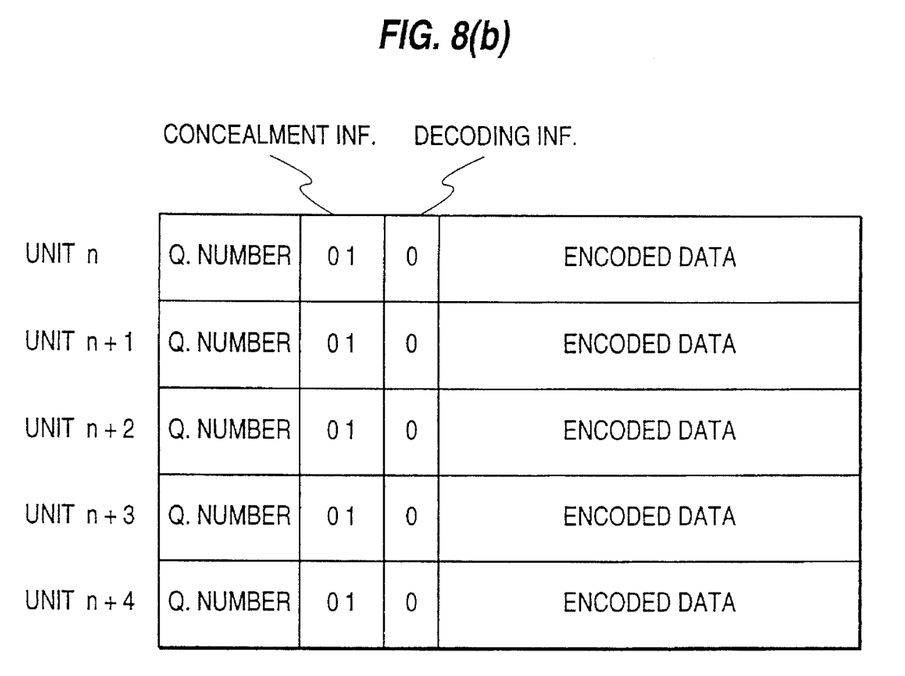
FIG. 8(b) is a diagram explaining concealment information data and additional information data to be set when all UNITs of one compression block are erroneous.

FIG. 8(a) shows the STATUS information data to be set for each UNIT in the case that only one UNIT of the five UNITs constituting one compression block is concealed. First, for the UNIT n that is concealed, the concealment information data is set to "01" and the decoding information data is set to a "1". Also, for each of UNIT (n+1) to UNIT (n+4), the concealment information data is set to "00" and the decoding information data is set to a "0". FIG. 8(b) shows the STATUS information data to be set for each UNIT in the case that all of the five UNITs constituting one compression block are concealed. For each of UNIT n to UNIT (n+4), the concealment information data is set to "01" and the decoding information data is set to a "0".

The data of each UNIT at the head of which the STATUS information data is multiplexed is on one hand decoded in the bit rate reduction decoder 111 to the original video signal, and on the other hand simultaneously sent out to the digital interface circuit 114. In the bit rate reduction decoder 111, first, a decoding method is determined depending on the decoding information data. In the case that the decoding information data is a "0" the data of all of the five UNITs constituting one compression block are decoded. Also, in the case that the decoding information data of at least one UNIT of the five UNITs constituting one compression block is a "1" only the data of the macro blocks corresponding to each UNIT are decoded, and the data which has overflowed from another UNIT are not decoded. In the digital interface circuit 114, the bit rate reduction encoded data are formatted to a specified transmission format and outputted from the terminal 115. In this case, the STATUS information data is sent out in the state that is multiplexed to each UNIT.

On the other hand, on the recording side of the apparatus, the data of the transmission format received through the terminal 119 are sent to the digital interface circuit 120 and returned to the original bit rate reduction encoded data. In case of digital dubbing, the switch 121 is fixed to the B-side thereof to select the output data of the digital interface circuit 120. The selected data is added to an error correction parity in the error correction encoder 122, modulated in the recording processing circuit 123, and recorded onto a magnetic tape MT by the recording head 124. That is, the error correction processing is carried out in the state that the STATUS information data is multiplexed to each UNIT, so that the STATUS information is recorded onto the magnetic tape.

According to the first embodiment, as described above, when the data having been subjected to a digital dubbing performed in the bit rate reduction encoded state is reproduced, the data of each UNIT can be perfectly decoded according to the decoding information data.

Figure 9:
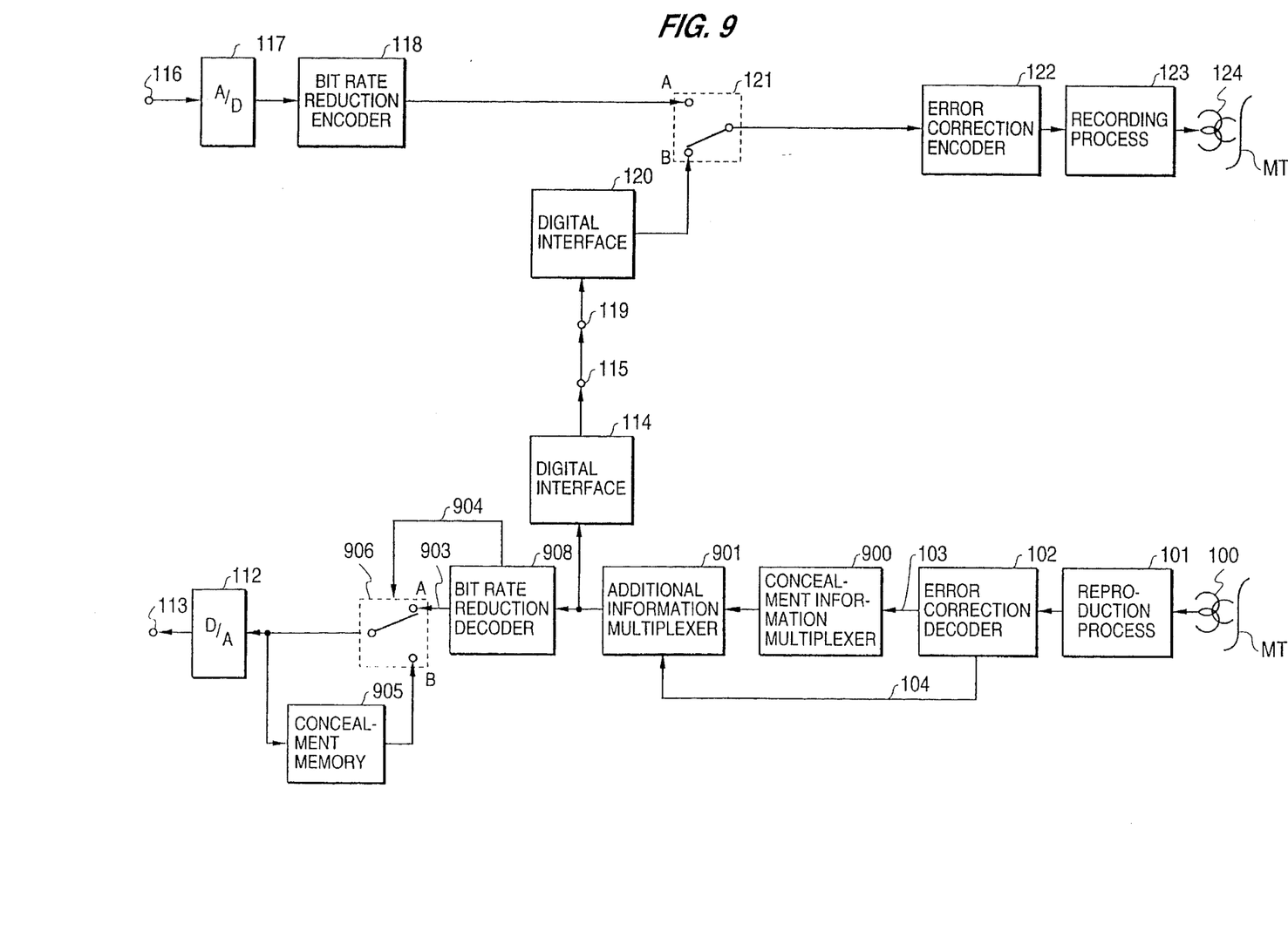
FIG. 9 is a block diagram of a digital video signal processing apparatus according to a second embodiment of this invention.

FIG. 9 is a block diagram of a digital video signal processing apparatus according to a second embodiment of this invention. This apparatus has a concealment information multiplexer 900, an additional information multiplexer 901, a bit rate reduction decoder 902, producing a bit rate reduction decoded video data 903 and an error flag 904 on a block by block basis, a concealment memory 905, and a switch 906 for selecting either the output data 903 of the bit rate reduction decoder 902 or an output data of the concealment memory 905.

In this embodiment, decoding is carried out for the bit rate reduction encoded data and error concealment is carried out for the decoded video signal. First, an output UNIT of the error correction decoder 102 is multiplexed with a concealment information data in the concealment information multiplexer 900. In this case, error concealment is not carried out for any UNIT having an error, and the concealment information data is always set to "00" and multiplexed. Next, in the additional information multiplexer 901, an error flag 104 is multiplexed to the corresponding UNIT. As a result, each UNIT is multiplexed with the concealment information data "00" and the error flag, and supplied to both the bit rate reduction decoder 902 and the digital interface circuit 114. The bit rate reduction decoder 902 carries out decoding according to the multiplexed error flag and outputs the decoded video data 903 and the error flag 904 in the unit of the block of 8×8 pixels. Namely, for the UNIT multiplexed with the error flag "1", the error flag 904 is set to a "1" for the five blocks forming the corresponding macro block.

Finally, error concealment is carried out by using the concealment memory 905 and switch 906. The switch 906 operates switching on a block by block basis in response to the error flag 904 When the error flag 904 is a "0" that is, when the block has no error, the switch 906 is set to the A-side thereof. Thus, the decoded data 903 from the bit rate reduction decoder 902 is selected and sent through the D/A converter 112 to the terminal 113, and at the same time written into the concealment memory 905. When the error flag 904 is "1" that is a , when the block has an error, the switch 906 is set to the B-side thereof. Thus, the decoded data of a corresponding block of one frame before is read out from the concealment memory 905 and sent through the D/A converter 11 2 to the terminal 113, and at the same time written into the concealment memory 905 again. As a result, the concealment memory 905 always has stored therein correct block data for concealment of data of the next and following frames. On the other hand, the concealment information data and the error flag are multiplexed to each UNIT and sent out from the terminal 115 as digital data in the bit rate reduction encoded state. The dubbing processing of the data in the apparatus on the recording side in this embodiment is the same as in the first embodiment.

As described above, according to this embodiment, in the case that the data having been subjected to digital dubbing in the bit rate reduction encoded state is reproduced, the data of each UNIT is concealed depending on the multiplexed error flag, so that it is possible not to output any erroneous data onto a reproduced picture.

Figure 10:
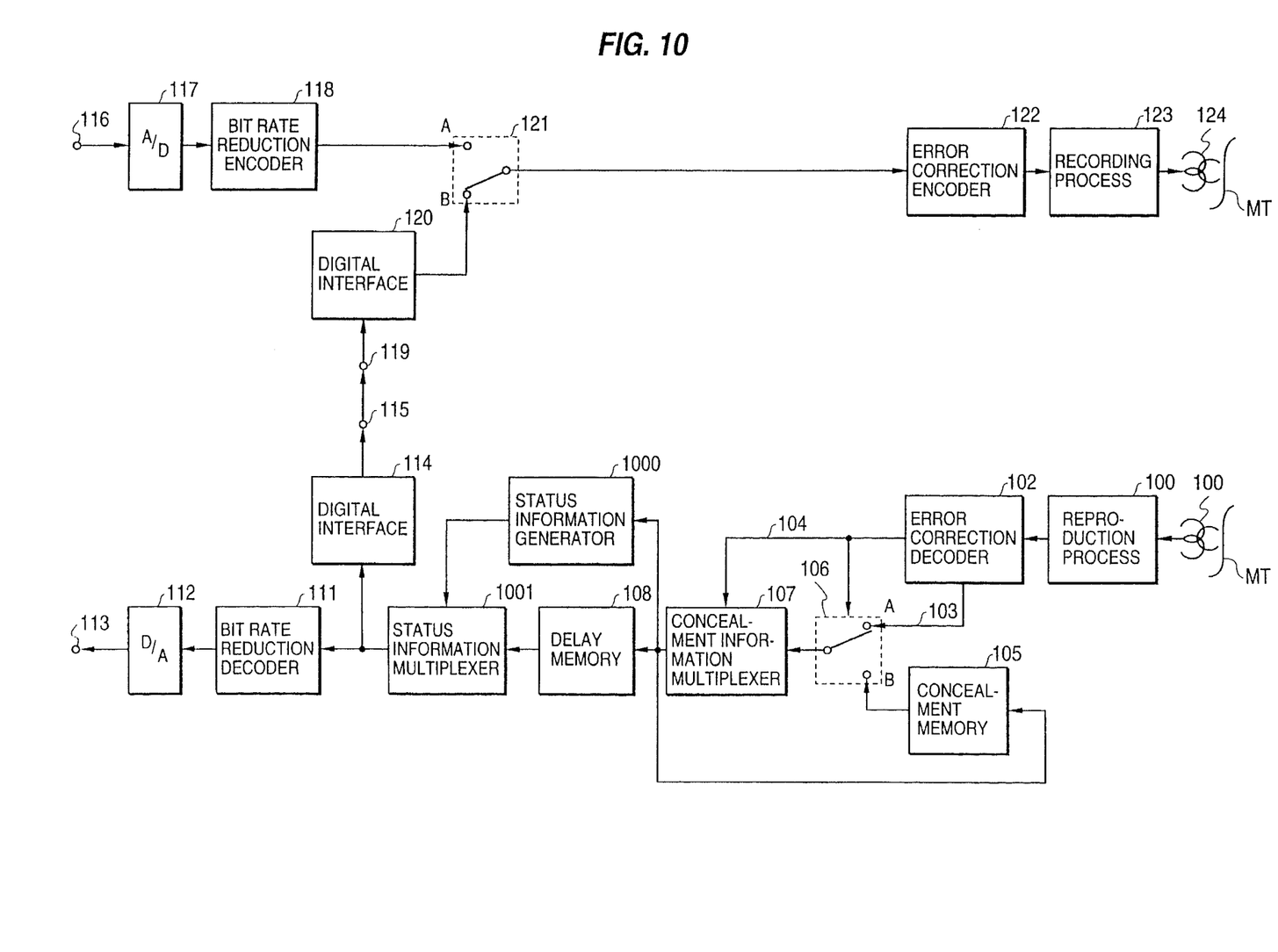
FIG. 10 is a block diagram of a digital video signal processing apparatus according to a third embodiment of this invention.

FIG. 10 is a block diagram of a digital video signal processing apparatus according to a third embodiment of this invention. This apparatus has a STATUS information generator 1000 and a STATUS information multiplexer 1001.

In this embodiment, each UNIT is multiplexed with a STATUS information data as shown in Table 2. Referring to the STATUS information data shown in Table 1, the concealment information is expressed in a two-bit code and the additional information is expressed in a one-bit code. Referring to the STATUS information data in Table 2, on the other hand, the concealment information, decoding information and error information are collectively expressed in a single four-bit code. FIG. 11 is a diagram showing a data arrangement of a UNIT multiplexed with the STATUS information data. The STATUS information generator 1000 generates a four-bit piece of STATUS information data in accordance with the concealment information data multiplexed in the concealment information multiplexer 107. The STATUS information multiplexer 1001 multiplexes the STATUS information data to the head of each UNIT instead of the concealment information data.

TABLE 2

| STATUS | Definition |
| --- | --- |
| 0000 | UNIT has no error |
|  | UNIT is not concealed. |
| 0010 | UNIT is concealed from one frame before. |
|  | Continuity of data with other UNITs is ensured. |
| 1010 | UNIT is concealed from one frame before. |
|  | Continuity of data with other UNITs is not ensured. |
| 0100 | UNIT is concealed from one frame after. |
|  | Continuity of data with other UNITs is ensured. |
| 1100 | UNIT is concealed from one frame after. |
|  | Continuity of data with other UNITs is not ensured. |
| 0110 | UNIT is concealed, but its method cannot be identified. |
|  | Continuity of data with other UNITs is ensured. |
| 1110 | UNIT is concealed, but its method cannot be identified. |
|  | Continuity of data with other UNITs is not ensured. |
| 1111 | UNIT has an error. |

Figure 12A:
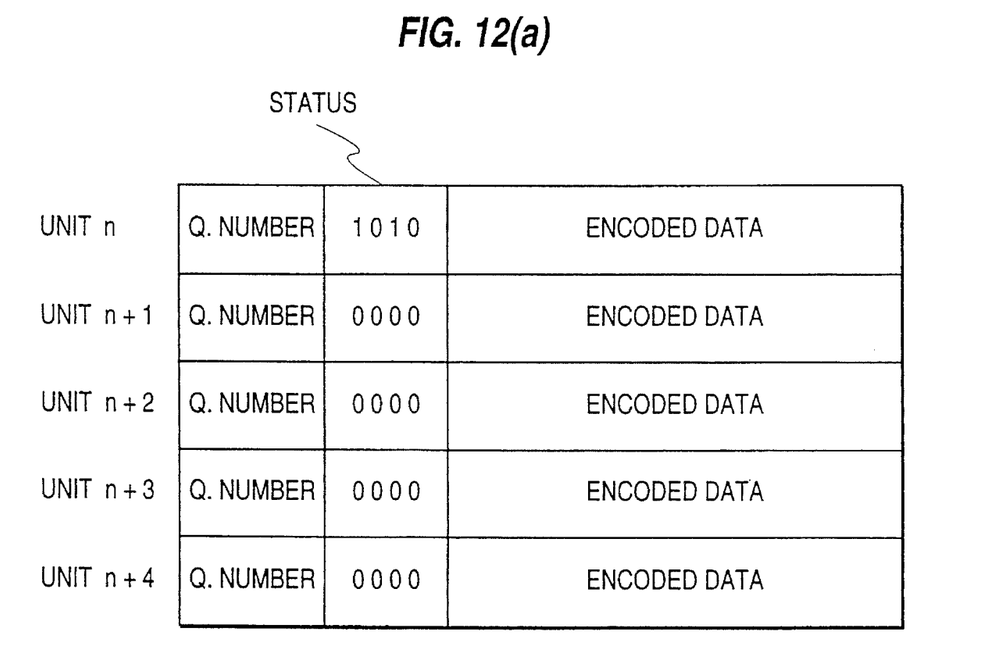
Figure 12B:
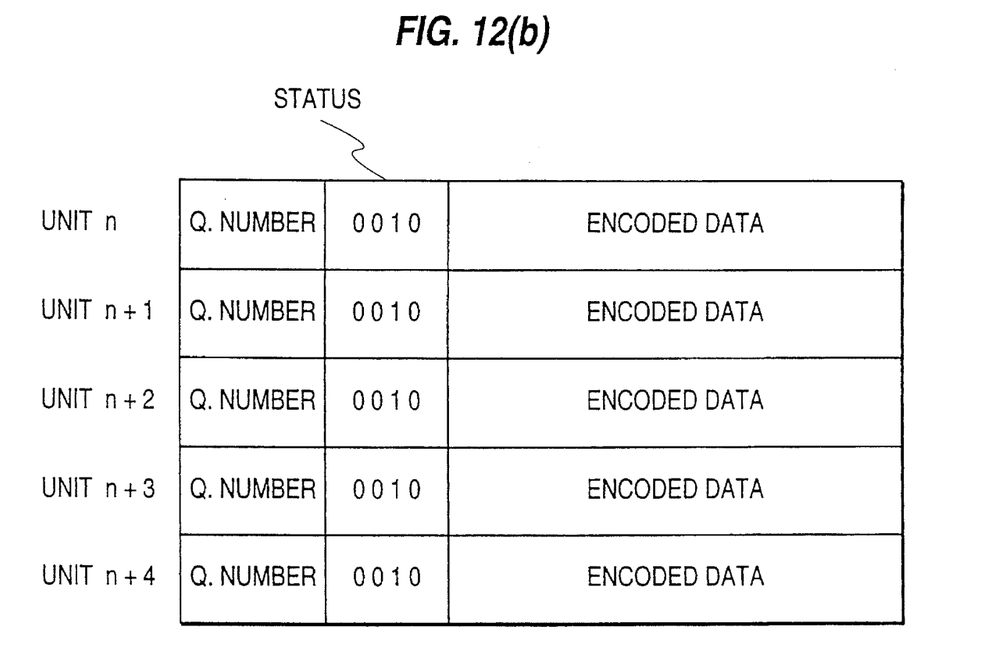

FIG. 12(a) shows the STATUS information to be set to each UNIT when only one UNIT of the five UNITs constituting one compression block in this embodiment is concealed. First, for the UNIT n that is concealed, the STATUS information data is set to "1010". For each of other UNITs (n+1) to (n+4), the STATUS information is set to "0000". FIG. 12(b) shows the STATUS information data to be set to each UNIT when all of the five UNITs constituting one compression block in this embodiment are concealed, in which the concealment information data is set to "0001" to each of UNIT n to UNIT (n+4).

As described above, according to this embodiment, by coding the concealment information, decoding information and error flag as the STATUS information data collectively expressed in a single four-bit code, it is possible to represent larger amount of information concerning the UNITs.

In addition, in the embodiments described above, a macro block is made of four luminance signal blocks and two chrominance signal blocks, but is not limited thereto, one macro block may be made of a different number of blocks.

Further, it should be noted that the output terminal 115 of the apparatus shown in FIG. 1 may be connected to either the input terminal 119 of the same apparatus or a corresponding input terminal (119) of another recording apparatus. The same thing can be said for the apparatuses shown in FIGS. 9 and 10.

Further, error concealment may be made by replacing a UNIT by a corresponding UNIT of a picture one frame after the current frame.

What is claimed is:

1. A digital video signal processing apparatus for reproducing a digital video signal from bit rate reduction coded data recorded on a recording medium in the form of record blocks which have been produced by dividing a digital video signal into small blocks, forming macro blocks each being composed of a specified number of small blocks, bit rate reduction encoding each of said macro blocks, forming said record blocks from the encoded macro blocks, respectively, and recording said record blocks on the recording medium, said apparatus comprising:

a reproducing means for reproducing said record blocks from the recording medium;

an error correction means coupled to said reproducing means for correcting errors contained in the reproduced record blocks;

an error concealment means coupled to said error correction means for performing error concealment of each of the reproduced record blocks having an error which cannot be corrected by said error correction means;

a multiplexing means coupled to said error concealment means for multiplexing, among the reproduced record blocks, each record block which has been concealed by said error concealment means with a concealment information data concerning the error concealment and a decoding information data concerning a decoding of said record block which has been concealed by said error concealment means, and for multiplexing, among the reproduced record blocks, each record block which has not been concealed by said error concealment means with a concealment information data concerning the error concealment and an error flag indicating whether or not an error exists in said record block which has not been concealed by said error concealment means, to obtain multiplexed record blocks each being multiplexed with said concealment information data and one of said decoding information data and said error flag;

a first output means coupled to said multiplexing means for outputting said multiplexed record blocks;

a decoding means coupled to said multiplexing means for decoding bit rate reduction encoded data in each of said multiplexed record blocks according to said decoding information data multiplexed to each said multiplexed record block to obtain a decoded digital video signal; and a second output means coupled to said decoding means for outputting the decoded digital video signal.

2. An apparatus according to claim 1, wherein said concealment information data represents whether or not each record block multiplexed with said concealment information has been concealed and how each of said record blocks has been concealed.

3. A digital video signal processing apparatus for reproducing a digital video signal from bit rate reduction coded data recorded on a recording medium in the form of record blocks which have been produced by dividing a digital video signal into small blocks, forming macro blocks each being composed of a specified number of small blocks, bit rate reduction encoding each of said macro blocks, forming said record blocks from the encoded macro blocks, respectively, and recording said record blocks on the recording medium, said apparatus comprising:

a reproducing means for reproducing said record blocks from the recording medium;

an error correction means coupled to said reproducing means for correcting errors contained in the reproduced record blocks;

a multiplexing means coupled to said error correction means for multiplexing each record block of the reproduced record blocks with a concealment information data concerning an error concealment with a first error flag indicating whether or not an error exists in said each record block to obtain multiplexed record blocks each being multiplexed with said concealment information data and said first error flag;

a first output means coupled to said multiplexing means for outputting said multiplexed record blocks;

a decoding means coupled to said multiplexing means for decoding bit rate reduction encoded data in each of said multiplexed record blocks according to said first error flag multiplexed to said each multiplexed record block to obtain a decoded digital video signal, and for outputting a second error flag for each small block or each macro block of the decoded digital video signal;

an error concealment means for performing an error concealment of each small block or macro block containing an error of the decoded digital video signal according to said second error flag; and a second output means coupled to said error concealment means for outputting the decoded digital video signal having been subjected to the error concealment.

4. A digital video signal processing apparatus for reproducing a digital video signal from bit rate reduction coded data recorded on a recording medium in the form of record blocks which have been produced by dividing a digital video signal into small blocks, forming macro blocks each being composed of a specified number of small blocks, bit rate reduction encoding each of said macro blocks, forming said record blocks from the encoded macro blocks, respectively, and recording said record blocks on the recording medium, said apparatus comprising:

a reproducing means for reproducing said record blocks from the recording medium;

an error correction means coupled to said reproducing means for correcting errors contained in the reproduced record blocks;

an error concealment means coupled to said error correction means for performing error concealment of each of the reproduced record blocks having an error which cannot be corrected by said error correction means;

a multiplexing means coupled to said error concealment means for multiplexing each of the reproduced record block with a status information data containing information concerning the error concealment of said each record block, information concerning decoding of said each record block and information as to whether or not an error exists in said each record block, to obtain multiplexed record blocks each being multiplexed with said status information data;

a first output means coupled to said multiplexing means for outputting said multiplexed record blocks;

a decoding means coupled to said multiplexing means for decoding bit rate reduction encoded data in each of said multiplexed record blocks according to said status information data multiplexed to said each multiplexed record block to obtain a decoded digital video signal; and a second output means coupled to said decoding means for outputting the decoded digital video signal.

5. An apparatus according to claim 4, wherein said concealment information represents whether or not each record block multiplexed with said status information data has been concealed and how each of said record blocks has been concealed.

* * * * *